Dec. 24, 1968     L. KEMPENAERS     3,417,642
METHOD OF DIVIDING A BODY COMPRISING A NUMBER OF
ELECTRIC CIRCUIT ELEMENTS INTO PARTS
Filed Aug. 24, 1966

INVENTOR.
LOUIS KEMPENAERS
BY
AGENT

United States Patent Office 3,417,642
Patented Dec. 24, 1968

3,417,642
METHOD OF DIVIDING A BODY COMPRISING A NUMBER OF ELECTRIC CIRCUIT ELEMENTS INTO PARTS
Louis Kempenaers, Forest Bruxelles, Belgium, assignor to North American Philips Company, Inc., New York, N.Y., a corporation of Delaware
Filed Aug. 24, 1966, Ser. No. 574,736
Claims priority, application Belgium, Aug. 27, 1965, 668,918
3 Claims. (Cl. 83—13)

ABSTRACT OF THE DISCLOSURE

A method of dividing a body comprising a plurality of circuit elements, i.e., a semiconductor wafer having diodes, resistors, etc. formed at selected surface portions thereof, into a multiplicity of portions each containing a circuit element comprising the steps of forming on a transparent plate a pattern corresponding to the cellular form of the cutting tool, securing the body to be cut onto the transparent plate with the circuit elements of the body within the bounds of the pattern formed on the transparent plate and thereafter operating the cutting tool to form the desired division.

---

The invention relates to a method of dividing a body comprising a plurality of electric circuit elements into parts by means of a cutting tool. This body may be formed by a semiconductor wafer, whilst the circuit elements may be formed by diodes, transistors, resistors, capacitors and combinations of such elements. The term "circuit elements" is to be understood herein to include also a group of one or more transistors, diodes, resistors and so on.

It is known to form a large number of such elements simultaneously in one body and to separate them subsequently by dividing the body into parts by means of a cutting tool, for example a diamond or an ultrasonic drill. This involves the problem that the cutting tool has to be accurately adjusted or centered with respect to the circuit elements, in order to avoid damage of these elements. Centering is hindered by the fact that the cutting tool or its holder renders it impossible to observe visually the portion of the body to be worked.

The invention has for its object inter alia to obviate this drawback.

According to the invention the cutting tool is first employed to mark at least one cut on a transparent plate, after which the circuit elements in or on the body are orientated with respect to the plate by visual observation and fixed to the plate, after which the cutting operation is repeated at the original place, but then on the body itself.

During the orientation and fixation the plate may be temporarily removed from the cutting tool.

After centering the body is preferably stuck to the plate, for example by means of a hardening lacquer or a thermoplastic binder, for example, wax.

It should be noted that the cutting operation referred to is understood to include other operations having the same result, such as ultrasonic drilling and sawing.

The invention will be described more fully with reference to one embodiment shown in the figures.

Figure 1:
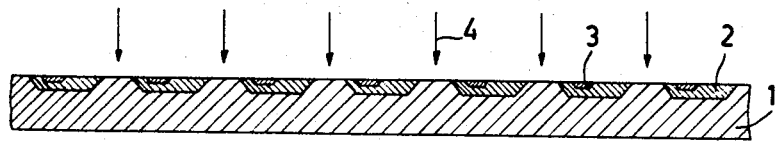
FIGS. 1 to 3 are diagrammatic sectional views of a semiconductor body, a cutting tool and a transparent plate in various stages of machining.
Figure 2:
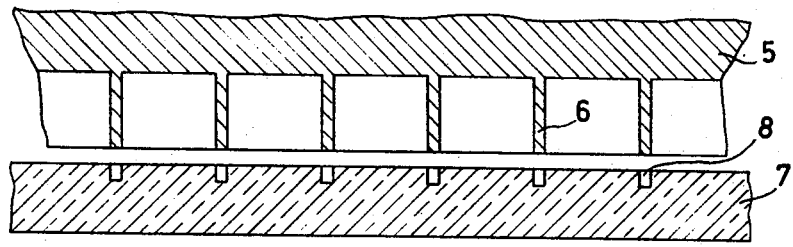
Figure 3:
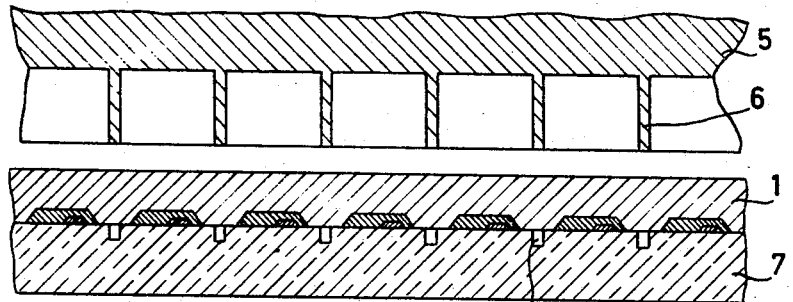

It is supposed that a semiconductor body 1, formed by a thin wafer in which transistors are formed by a number of diffusion zones 2 and 3 has to be divided into portions such that each portion comprises a transistor. The arrows 4 of FIG. 1 indicate the places of the cuts to be made. These cuts may be made in known manner by means of an ultrasonic drill comprising a base 5 and a number of cutting faces 6 (see FIG. 2). By means of such a drill a great number of, for example, round discs can be cut simultaneously from a semiconductor wafer.

Difficulties arise in accurately centering this drill with respect to the transistors of the body 1, particularly if the distance between the transistors is small. The centre distance between the transistors may be 500 to 1000μ, whereas the width of the cut may be 100 to 300μ. The difficulty involved in centering is at least partly due to the fact that the drill itself prevents an accurate observation of the place where it is disposed on the surface of the body 1.

However, by using precision tools it can be ensured that drilling operations carried out in order of succession are invariably performed at the same place. When the cuts 8 are marked in a first drilling operation on a transparent plate 7, for example, of glass, it is afterwards only necessary to orientate the body 1 with respect to these cuts. For this purpose the body 1 is disposed upside down on the plate 7 so that one transistor is located between two cuts 8, which can be easily seen from the bottom side of the plate 7.

The plate 7 and the body 1 can then be fixed relatively to each other, for example, by applying a very thin layer of wax between them in slightly heated state.

By the second drilling operation the body 1 is cut accurately between the transistors.

Figure 4:
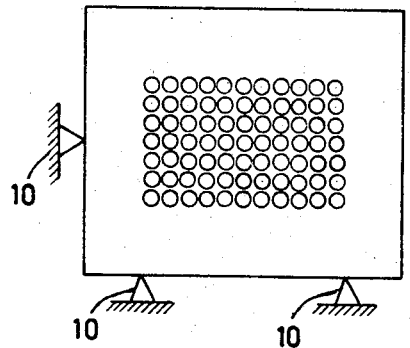
FIG. 4 is a diagrammatic plan view of part of the cutting tool.

When machining a larger number of bodies 1 it is advisable to arrange the plates 7 on a support so as to be removable; this support is shown diagrammatically in a plan view in FIG. 4 in the form of three lugs 10. After a plate 7 has been provided with marks, it can be removed and be united, for example under a microscope, with a body 1. When the plate is subsequently again disposed on the support, the initial accurate adjustment is restored.

In a similar manner the semiconductor body may also be cut by means of a diamond or a sewing member.

The invention is not restricted to machining semiconductor bodies; it may be employed, for example, also for dividing insulating bodies on which a number of circuit elements is formed by so-called thin-film techniques.

What is claimed is:

1. A method of dividing a body comprising a plurality of individual circuit elements into a plurality of parts each comprising one of said circuit elements, comprising the steps of placing a transparent plate member in a reference position, engaging said plate member with a cutting tool to form on said plate member a reference mark indicative of the relative position of the cutting tool and the plate member, positioning the body to be divided on the plate member with the said circuit elements in a given position relationship to the said reference mark, affixing the body to the plate member while so positioned, and thereafter dividing the said body into a plurality of portions by actuating said cutting tool while the said transparent plate member is in said reference position.

2. A method as claimed in claim 1 wherein said cutting tool comprises a multiplicity of cutting edges of tubular form each having an area greater than the projected area of a circuit element, wherein said cutting tool forms on said plate member a reference mark in the form of a multiplicity of closed channels having the configuration of said cutting edges, and wherein said body is positioned on the transparent plate member with the circuit elements respectively contained within the projections of the area bounded by the said closed channels.

3. A method as claimed in claim 2 wherein the cutting edges are circular, and said cutting tool is actuated to divide said body into circular discs.

References Cited

UNITED STATES PATENTS

| | | | |
|---|---|---|---|
| 908,817 | 1/1909 | Thomas | 83—413 X |
| 1,435,418 | 11/1922 | Paris | 83—413 |
| 3,161,101 | 12/1964 | Falk | 83—520 X |

ANDREW R. JUHASZ, *Primary Examiner.*

U.S. Cl. X.R.

29—407; 83—520

UNITED STATES PATENT OFFICE
CERTIFICATE OF CORRECTION

Patent No. 3,417,642                                                             December 24, 19

Louis Kempenaers

It is certified that error appears in the above identified patent and that said Letters Patent are hereby corrected as shown below:

In the heading to the printed specification, line 11, "668,918" should read -- 17,249 --. Column 2, line 48, "sewing" should read -- sawing --.

Signed and sealed this 10th day of March 1970.

(SEAL)
Attest:

Edward M. Fletcher, Jr.                               WILLIAM E. SCHUYLER, JR.
Attesting Officer                                                   Commissioner of Patents